United States Patent
Poloni et al.

(10) Patent No.: US 8,931,789 B2
(45) Date of Patent: Jan. 13, 2015

(54) TIE ROD WITH LOCKING SYSTEM AT THE ENDS

(75) Inventors: Alfredo Poloni, Fogliano Redipuglia (IT); Matteo Nobile, Ruda (IT)

(73) Assignee: Danieli & C. Officine Meccaniche S.p.A., Buttrio (IT)

( * ) Notice: Subject to any disclaimer, the term of this patent is extended or adjusted under 35 U.S.C. 154(b) by 0 days.

(21) Appl. No.: 14/130,872

(22) PCT Filed: Jul. 6, 2012

(86) PCT No.: PCT/IB2012/053467
§ 371 (c)(1),
(2), (4) Date: Jan. 3, 2014

(87) PCT Pub. No.: WO2013/008160
PCT Pub. Date: Jan. 17, 2013

(65) Prior Publication Data
US 2014/0138927 A1    May 22, 2014

(30) Foreign Application Priority Data

Jul. 8, 2011   (IT) .............................. MI2011A1276

(51) Int. Cl.
| | |
|---|---|
| B62D 7/16 | (2006.01) |
| B62D 7/20 | (2006.01) |
| F16B 5/02 | (2006.01) |
| F16B 43/00 | (2006.01) |
| C21C 5/46 | (2006.01) |
| F16B 39/12 | (2006.01) |

(52) U.S. Cl.
CPC ... *B62D 7/20* (2013.01); *C12C 5/50* (2013.01); *F16B 5/025* (2013.01); *F16B 5/0275* (2013.01); *F16B 43/00* (2013.01); *C21C 5/4633* (2013.01); *F16B 39/12* (2013.01)
USPC ..................................... 280/93.51

(58) Field of Classification Search
CPC ............ F16B 5/02; F16B 39/12; F16B 43/02; B62D 7/20
USPC ............. 280/93.51, 93.502; 403/109.1–109.8
See application file for complete search history.

(56) References Cited

U.S. PATENT DOCUMENTS

| | | | | |
|---|---|---|---|---|
| 5,551,722 A | * | 9/1996 | Schwartz et al. | ...... 280/124.152 |
| 5,807,010 A | * | 9/1998 | Parker et al. | ..................... 403/61 |
| 7,354,054 B2 | * | 4/2008 | Pazdirek | ................ 280/124.152 |
| 2012/0230799 A1 | * | 9/2012 | Wiedner et al. | ............... 411/305 |

FOREIGN PATENT DOCUMENTS

JP    2001288990    10/2001

* cited by examiner

*Primary Examiner* — Paul N Dickson
*Assistant Examiner* — Robert A Coker
(74) *Attorney, Agent, or Firm* — Stetina Brunda Garred & Brucker

(57) ABSTRACT

A tie rod comprising locking elements to lock the tie rod to respective end supports (60,60'), the locking elements comprising, at each end support, two pairs of spacers (42, 43, 42', 43'), each pair having surfaces joined to each other in the shape of an annular portion of a spherical cap, and at least two tightening nuts (41); wherein, at each end support, there are provided, symmetrically with respect to the support, two pairs of spacers, wherein the pair of joined surfaces of the first pair of spacers (42,43) has a radius equal to the radius of the pair of joined surfaces of the second pair of spacers (42', 43'), said pairs of joined surfaces being arranged on different spherical surfaces, and wherein the two tightening nuts (41) are tightened externally on the first pair of spacers (42,43).

10 Claims, 9 Drawing Sheets

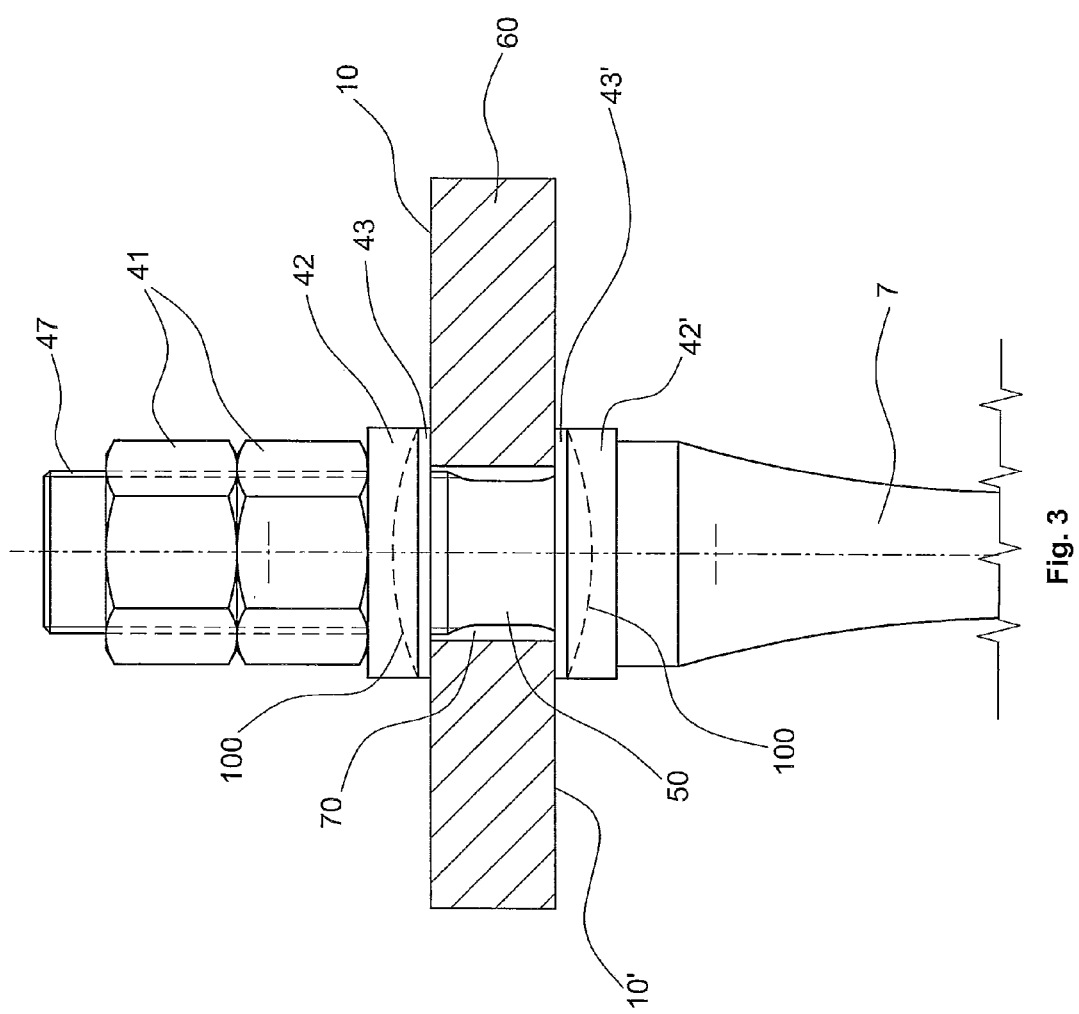

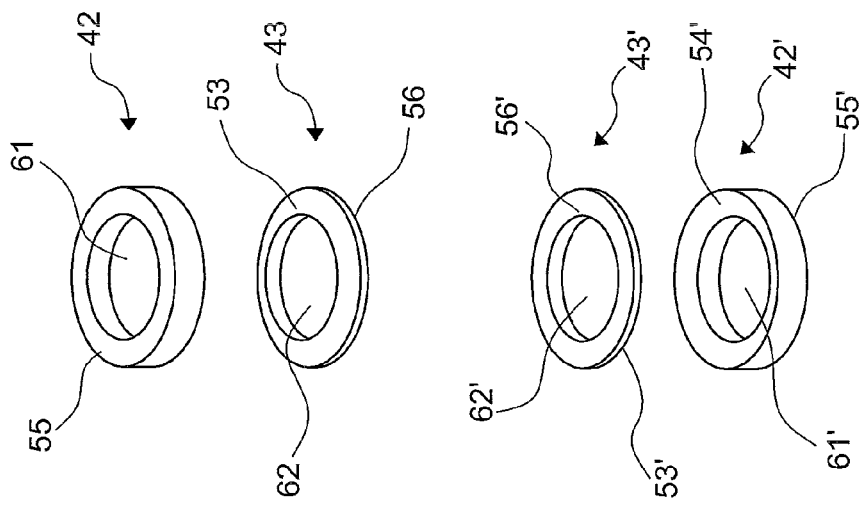
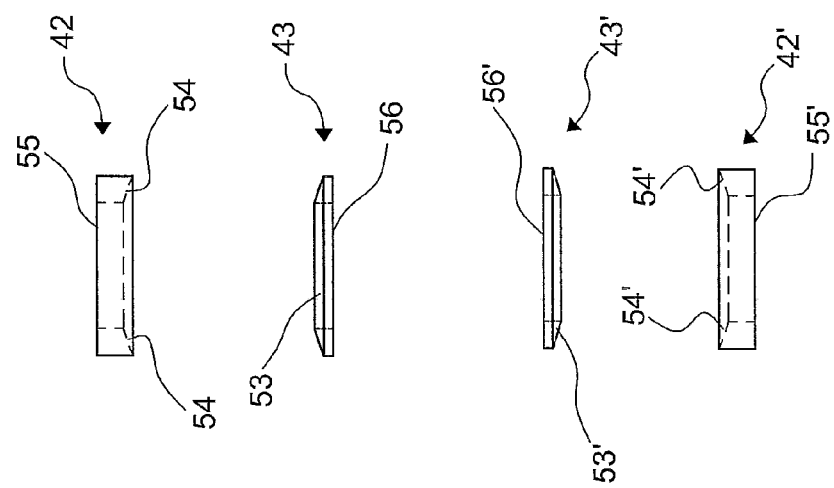
Fig. 8b
Fig. 8a

TIE ROD WITH LOCKING SYSTEM AT THE ENDS

CROSS REFERENCE TO RELATED APPLICATION

The present application claims priority to PCT International Application No. PCT/IB2012/053467 filed on Jul. 6, 2012, which application claims priority to Italian Patent Application No. RM2011A001276 filed Jul. 8, 2011.

STATEMENT RE: FEDERALLY SPONSORED RESEARCH/DEVELOPMENT

Not Applicable.

BACKGROUND OF THE INVENTION

1. Field of the Invention

The present invention relates to a tie rod provided with a locking system at the ends, useable, for example, in a suspension system.

2. State of the Art

Various tie rod types are known and used in a wide array of applications. An example of these applications is the use of tie rods in suspension systems connecting a first element to a second element, such as, for example, a suspension system of the container of a tilting oxygen converter, connecting said container to a support ring.

In these applications, the tie rods are fixed to at least one of the ends by means of ball joints.

The presence of ball joints determines a non-negligible maintenance of the latter, and requires constant greasing and preventive replacement of the joints as a result of the working conditions to which they are subjected.

Furthermore, the tie rods are fixed to fixed end supports, the resting surfaces of which are generally made using low-accuracy machine tools.

Therefore, such resting surfaces have machining errors which imply very rough parallelism tolerances and/or shape irregularities, and consequently the testing surfaces of the end supports of the tie rod may not be perfectly parallel, thus converging, causing a discontinuous resting of the locking elements and consequent clearances which are harmful to resistance to wear and stability of the tie rod.

There may also be errors of distance between the external surface of the first end support and the external surface of the second end support.

It is thus felt the need to make a tie rod which allows to overcome the aforesaid drawbacks.

SUMMARY OF THE INVENTION

It is the main object of the present invention to make a tie rod provided at the ends with locking elements configured so as to eliminate the misalignment errors of the resting surfaces of the end supports.

Another object of the invention is to make a tie rod which allows to compensate for distance errors between the resting surfaces integral with a first element and those integral with a second element, so that the structure can adapt to all the variable distances which may be found in design.

A further object of the invention is to make a tie rod which does not require maintenance, allowing to eliminate routine and supplementary interventions and eliminating the replacement of the elements subject to wear.

The present invention thus suggests to achieve the objects discussed above making a tie rod which, in accordance with claim 1, comprises locking elements to lock the ends of the tie rod to respective end supports, the tie rod being able to cross said end supports.

wherein said locking elements comprise, at each end support, two pairs of spacers, each pair of spacers having surfaces joined to each other substantially in the shape of an annular portion of a spherical cap, and at least two tightening nuts wherein, at each end support, there are provided in a fixed-end tie rod configuration a first pair of spacers arranged at an external side of the end support, a second pair of spacers arranged at an internal side of the end support, wherein said first pair of spacers and said second pair of spacers are arranged symmetrically with respect to the end support, wherein the pair of joined surfaces of the first pair of spacers has a radius equal to the radius of the pair of joined surfaces of the second pair of spacers, said pairs of joined surfaces being arranged on different spherical surfaces, and wherein said at least two tightening nuts are tightened externally on said first pair of spacers.

According to another aspect of the invention, a suspension system is provided connecting a first element to a second element, comprising a plurality of tie rods according to claim 1.

According to a further aspect of the invention, there is provided a tilting oxygen converter comprising said suspension system, wherein said first element is a container of the converter and said second element is a support ring of said container, wherein said tie rods are restrained at a first end to the container and at a second end to the support ring, and wherein the respective two end supports of each tie rod are integrally fixed with respect to the container and the support ring, respectively.

In a first advantageous variant, two pairs of spacers are provided at each end support, each pair of spacers having surfaces joined to each other substantially in the shape of a spherical cap, being arranged at a first side of the end support opposite to a second side at which the other pair is arranged. Tightening nuts adjacent to the external pair of spacers are provided on the external side.

In addition to the elements of the first variant, a second advantageous variant includes a pair of further spacers, such as flanges or resting shims, at least at one of the two end supports. Each flange is interposed between a pair of spacers and a respective end support side. Tightening nuts are included adjacent to the external pair of spacers on the external side. A further adjustment nut adjacent to the internal pair of spacers is included on the internal side.

Advantageously, the solution of clamping the tie rod on the two ends allows to compensate for misalignment errors of the resting surfaces of each end support by means of the sliding between the spherical cap shaped joined surfaces of the respective pairs of spacers. At each end support, the radius of the spherical cap is the same for both the joined surface pairs but the centers are different, i.e. the two spherical cap surfaces (see dashed curved lines 100 in FIG. 3) do not belong to a same spherical surface. As a consequence, this configuration of the spacers is a self-aligning "fixed-end joint", i.e. a joint which cannot work as ball joint but necessarily works as fixed joint when the bar is tightened. The spherical cap joined surfaces allow a rotation during the step of assembling so that these surfaces also join with each other. The flat surfaces of the spacers are deformed following the tightening, so that the contact between said flat surfaces and resting surfaces of the end support is maximized in order to obtain a continuous rest.

The use of this locking system allows to avoid the use of the high accuracy machines needed to cancel the aforesaid misalignment errors, and thus allows to avoid higher manufacturing and management costs.

In addition to the advantages deriving from the use of the pairs of joined spherical surface spacers discussed above, the fact of including in a variant an internal adjustment nut allows to compensate for distance errors between the resting surfaces integral with the first element and those integral with the second element.

A further advantage is represented in that the adjustment nut is configured to be higher than the useful part of thread of an intermediate threaded portion of a thread of the tie rod bar, so as to avoid notching stress concentrations caused by uncovered threads of the part subject to bending of the bar itself. Once tightened, the internal nut will thus have uncovered threads at the area in which the bar tapers off towards the inside thereof.

In particular the tie rod, object of the present invention, which can be clamped, has the following advantages:
  it allows to easily absorb thermal expansions of the elements to which it is connected, exploiting only the elasticity of the tie rod bar itself;
  it effectively absorbs the vibrations which are generated during machining or processes which concern the elements to which it is connected;
  it effectively absorbs the forces generated by the inertia of the elements to which it is connected, both when a rotation thereof starts or ends;
  it does not require any maintenance with respect to traditional systems which use ball joints and pins subject to wear, with saving in terms of maintenance hours;
  the low bending rigidity of the elastic bar allows to limit the bending load on the bar generated by the expansions to which the elements, to which the tie rod is connected, are subjected;
  the fixed beam configuration allows to support high loads also in strut configuration of the tie rod;
  it is extremely simple to assemble.

The dependent claims describe preferred embodiments of the invention.

BRIEF DESCRIPTION OF THE DRAWINGS

Further features and advantages of the present invention will be apparent in view of the detailed description of preferred, but not exclusive, embodiments of a tie rod illustrated by way of non-limitative example, with reference to the accompanying drawings, in which:

FIG. 3 is an enlarged section view of a first part in FIG. 1;

FIGS. 8a and 8b are exploded views (side and perspective, respectively) of two pairs of spacers;

The same reference numbers in the figures identify the same elements or components.

DETAILED DESCRIPTION OF THE INVENTION

Figures from 1 to 3 show a first preferred embodiment of a tie rod, indicated by numeral 1 as a whole.

Figure 9A:
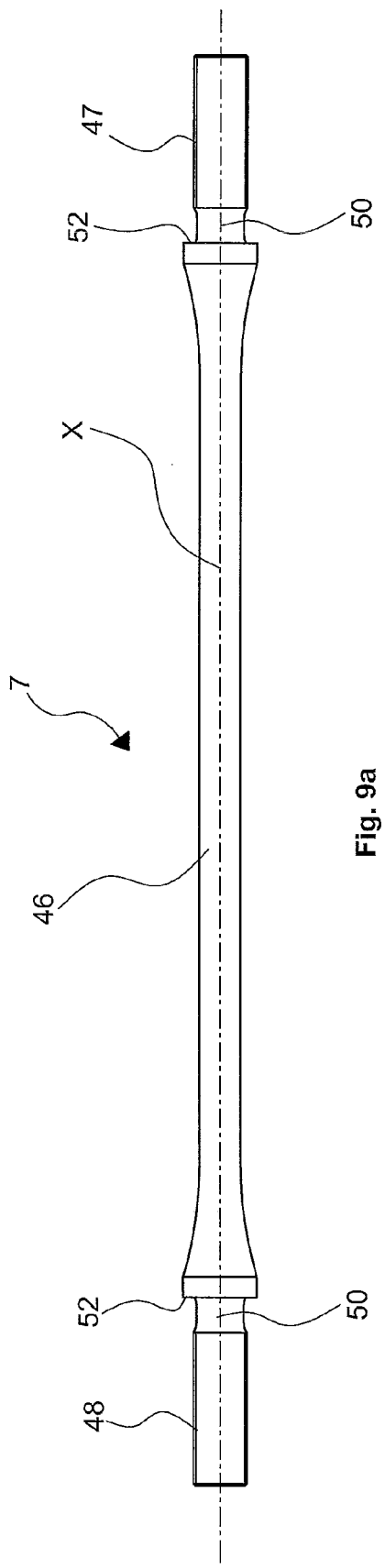
FIG. 9a is a side view of a tie rod bar in FIG. 1.

Such a tie rod 1 comprises:
  a longitudinal bar 7, provided with threaded ends 47, 48;
  locking elements to lock the ends of the bar 7 to respective end supports 60, 60', The longitudinal bar 7 (FIG. 9a) comprises a central portion 46, delimited by two shoulders 52, and two lateral portions 50, each lateral portion 50 being arranged between a threaded end 47, 48 and the corresponding shoulder 52. The diameter of each lateral portion 50 is smaller than the diameter of the adjacent threaded end 47, 48. The longitudinal extension along axis X of each lateral portion 50 is substantially equal to the longitudinal extension of the hole 70 provided in the end supports 60, 60' (FIG. 3).

The locking elements comprise at the end of each bar 7:
  two pairs of spacers 42, 43 and 42', 43', each pair of spacers advantageously having surfaces joined to each other 53, 54 and 53', 54 substantially in the shape of an annular portion of a spherical cap (FIGS. 8a and 8b);
  and at least two tightening nuts 41, In a fixed-end tie rod configuration, the following are provided at each end support:
  a first pair of spacers 42, 43 arranged at an external side of the respective end support,
  a second pair of spacers 42', 43' arranged at an internal side of the respective end support.

Advantageously, the first pair of spacers and the corresponding second pair of spacers are arranged symmetrically with respect to the interposed end support, and the radius of the pair of joined surfaces 53, 54 of the first pair of spacers is equal to the spherical cap radius of the pair of joined surfaces 53', 54' of the second pair of spacers, said pairs of joined surfaces being in all cases arranged on different spherical surfaces. The longitudinal elastic bar 7 is thus clamped (not ball joint) by means of an innovative locking system to the two end supports for the axial closing and compensation of misalignments.

Said at least two tightening nuts 41 are externally tightened onto the first pair of spacers 42, 43, i.e. onto the external pair of spacers.

In particular, with reference to Figures from 1 to 3, the clamping locking system of the elastic bar 7 includes at each of the treaded ends 47 and 48 of the bar (FIG. 3):
  external tightening nuts 41, e.g. at least two in number, to be tightened on the respective threaded end of the bar 7;
  a first external pair of spacers or washers 42, 43, to be arranged between said two tightening nuts 41 and the external surface 10 of the end support 60, 60'; each spacer 42, 43 being provided with a respective hole 61, 62 for the passage of the respective threaded end of the bar 7, the spacer 43 having an annular portion surface 53 of spherical cap joined to a corresponding surface 54 provided in the spacer 42 (FIGS. 8a and 8b);
  a second internal pair of spacers or washers 42', 43', to be arranged between the shoulder 52 of the bar 7 and the internal surface 10' of the end support 60, 60'; each spacer 42', 43' being provided with a respective hole 61', 62' for the passage of the respective threaded end of the bar 7, the spacer 43' having a surface 53' of annular portion of spherical cap joined to a corresponding surface 54' provided in the spacer 42' (FIGS. 8a and 8b).

The first end support 60 is provided with a hole 70 for the passage of a respective end of the bar (FIG. 3). The second end support 60' is provided with a further hole for the passage of the bar.

Figure 1:
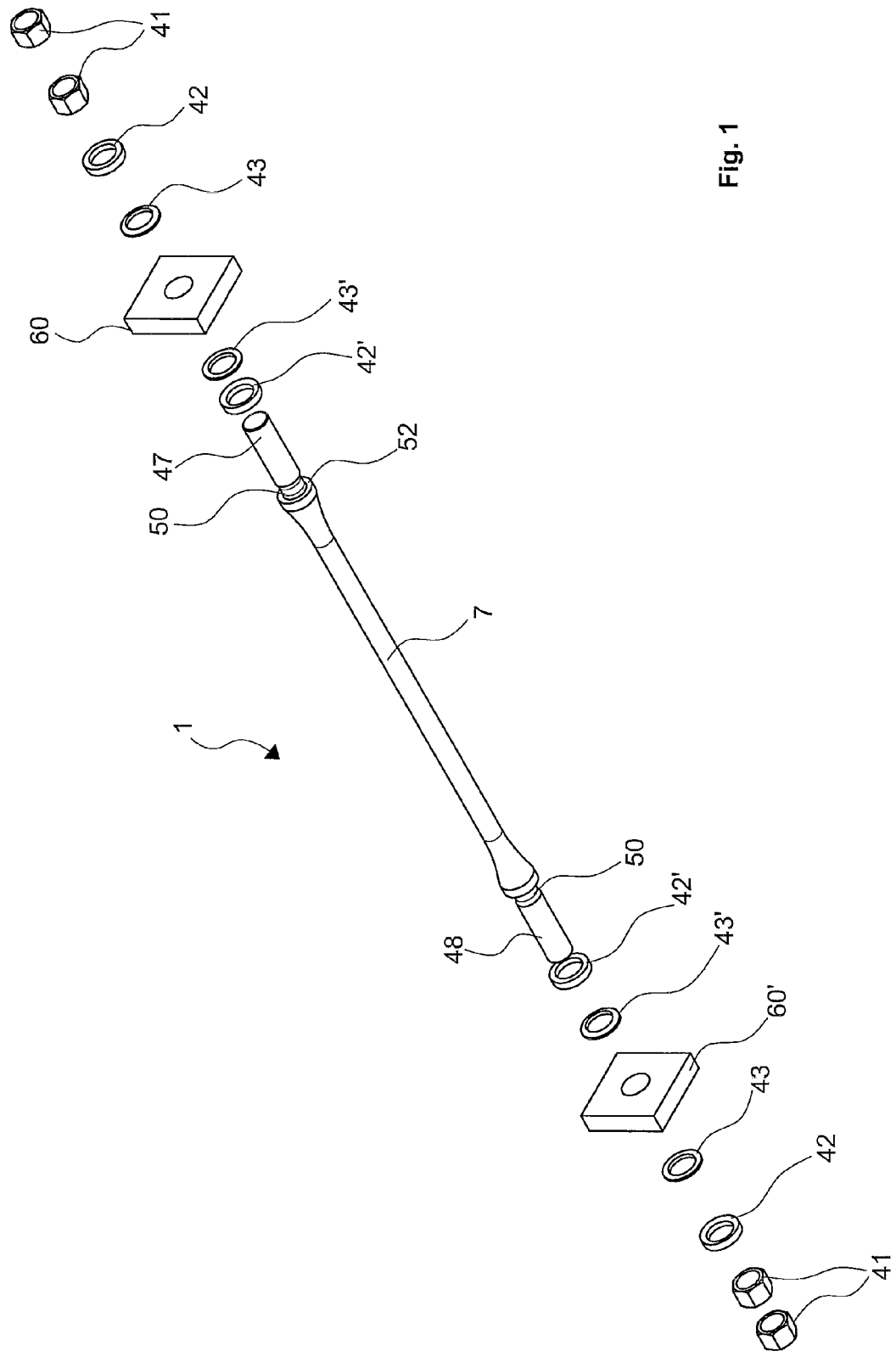
FIG. 1 is a perspective view of a first embodiment of the tie rod of the invention.
Figure 2B:
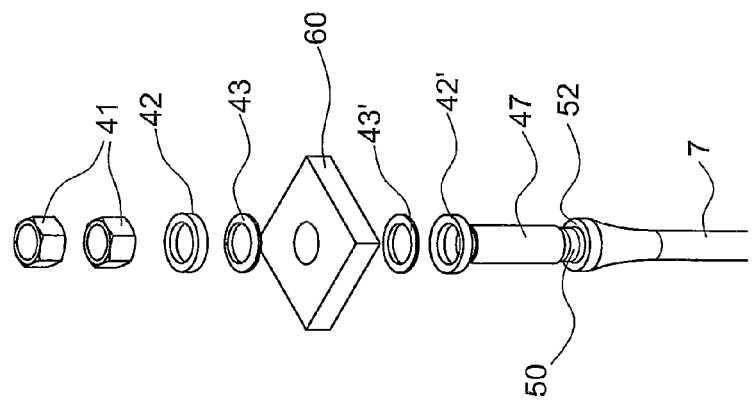
FIGS. 2a and 2b are exploded views (side and perspective, respectively) of a first part in FIG. 1.
Figure 2A:
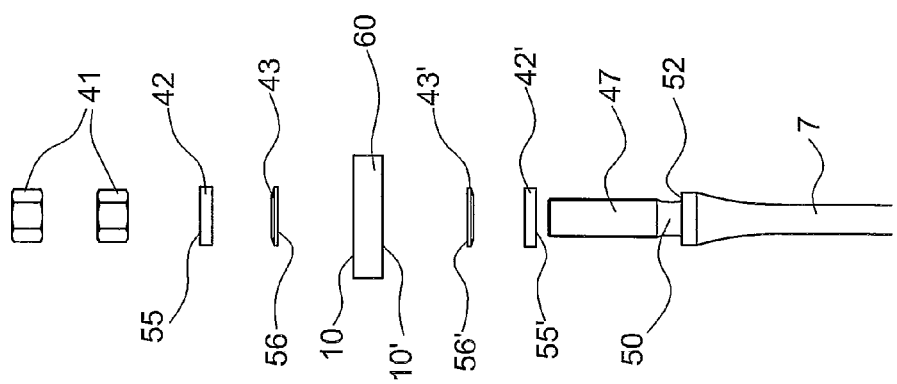

With reference to FIGS. 2, 3 and 8, the spacer 42' rests with a flat surface 55' thereof on the shoulder 52 while the spacer 43' rests with a flat surface 56' thereof on the internal surface 10' of the end support. The spacer 43 rests instead with a flat surface thereof 56 on the external surface 10 of the end support while the flat surface 55 of the spacer 42 is pressed by the tightening nuts 41.

By tightening the nuts 41 on the threaded end of the bar 7, the joined surfaces 53', 54' of the spacers 43', 42' and the joined surfaces 53, 54 of the spacers 43, 42 respectively achieve a complete contact with each other, while the flat surfaces 56, 56' adapt to the shape of the respective surfaces 10, 10' of the end support 60, 60'.

The spherical cap joined surfaces allow a rotation during the step of assembly whereby these surfaces always fit together with each other. The flat surfaces 56, 56' of the spacers 43, 43' will deform following the tightening, whereby the contact between said flat surfaces 56, 56' and the resting surfaces 10, 10' of the end support is maximized in order to obtain a continuous rest.

Figures from 4 to 7 show a second preferred embodiment of a tie rod, indicated by numeral 1 as a whole.

This tie rod has the same features as the tie rod of the first embodiment and additionally includes a pair of further spacers, such as flanges or resting shims 44, 45, which, in a fixed-end tie rod configuration, are arranged at one of the two support ends. In particular, a first flange 45 is arranged between the external pair of spacers 42, 43 and the respective external surface 10 of the end support and a second flange 44 is arranged between the internal pair of spacers 42', 43' and the respective internal surface 10' of the end support.

Figure 9B:
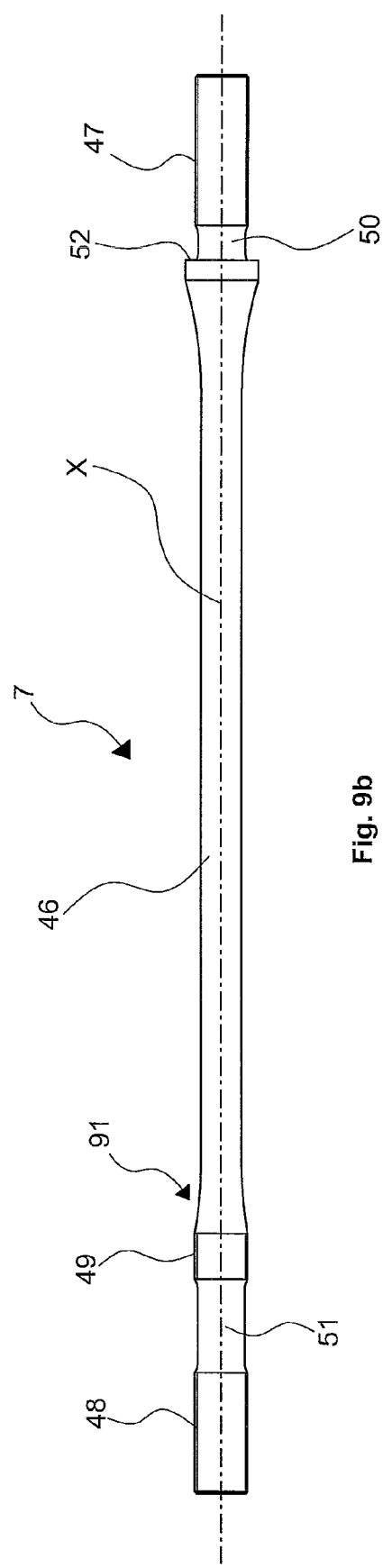
FIG. 9b is a side view of a tie rod bar in FIG. 4.
Figure 10:
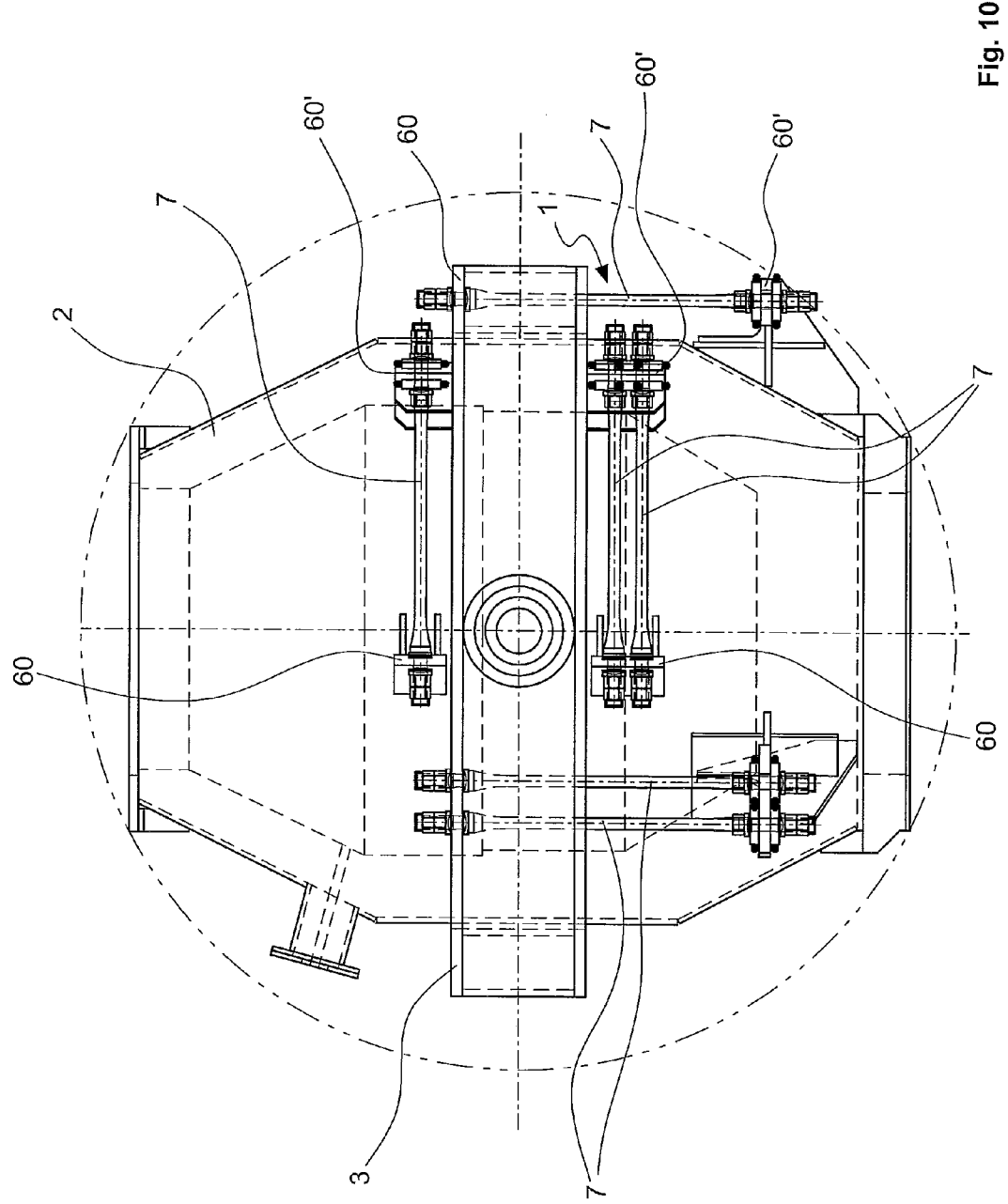
FIG. 10 is a view of a tilting oxygen converter comprising a plurality of tie rods according to the invention.

The longitudinal bar 7 (FIG. 9b) comprises a central portion 46, delimited on one side by a shoulder 52 and on the other by an intermediate threaded portion 49, and two lateral portions 50, 51 having reciprocally different longitudinal extension along axis X.

The lateral portion 50 is arranged between the threaded end 47 and the corresponding shoulder 52 and has a longitudinal extension along axis X essentially equal to the longitudinal extension of the hole 70 provided in the end support 60 (FIG. 3). The diameter of the lateral portion 50 is smaller than the diameter of the adjacent threaded end 47.

The lateral portion 51, instead, is arranged between the threaded end 48 and said threaded intermediate portion 49 and has a longitudinal extension along axis X longer than the longitudinal extension of the lateral portion 50 and slightly longer than the sum of the longitudinal extensions of the three holes 80, 90, 90' (FIG. 6), included in the respective end support 60' and in the two flanges 44, 45, respectively. The diameter of the lateral portion 51 is smaller than the diameter of the adjacent threaded ends 48 and of the intermediate threaded portion 49.

Advantageously, the presence of the flanges 44 and 45 allows to maintain the hole 80 much larger than the diameter or thickness of the bar, thus facilitating the passage of the bar and the assembly thereof onto the end supports. In this manner, in addition to compensating for distance planarity errors, the alignment errors between the hole 70 of end support 60 and the hole 80 of end support 60' are also compensated.

Advantageously, the locking elements further comprise, at the ends of the bar provided with the flanges 44, 45, a further tightening nut 41', which is tightened onto the intermediate threaded portion 49 to abut on the internal pair of spacers 42', 43'.

Figure 7:
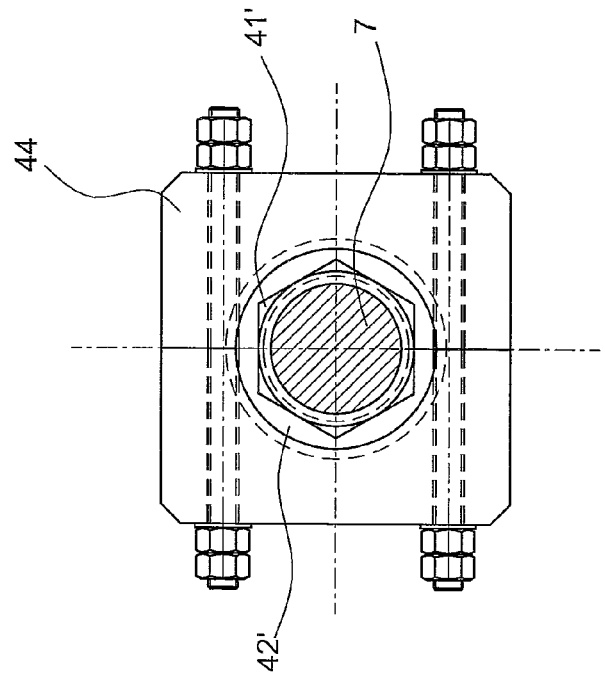
FIG. 7 is a side section view of said first part in FIG. 6.

In particular, the clamping locking system of the elastic bar 7 includes at the threaded end 48 of the bar 7 (FIGS. 6 and 7):
    external tightening nuts 41, e.g. in a minimum number of two, to be tightened onto the respective threaded end 48;
    an internal nut 41' to be tightened onto the intermediate threaded portion 49;
    two flanges 44, 45, or support thicknesses (shims), to be arranged so that the end support 60' is arranged between said two flanges;
    a first external pair of spacers or washers 42, 43, to be arranged between said tightening nuts 41 and the external flange 45; each spacer 42, 43 being provided with a respective hole 61, 62 for the passage of the threaded end 48 of the bar 7, the spacer 43 having an annular portion surface 53 of spherical cap joined to a corresponding surface 54 provided in the spacer 42 (FIGS. 8a and 8b);
    a second internal pair of spacers or washers 42', 43', to be arranged between the internal flange 44 and the internal nut 41'; each spacer 42, 43 being provided with a respective hole 61', 62' for the passage of the threaded end 48 of the bar 7, the spacer 43' having a surface 53' of annular portion of spherical cap joined to a corresponding surface 54' provided in the spacer 42'.

Figure 4:
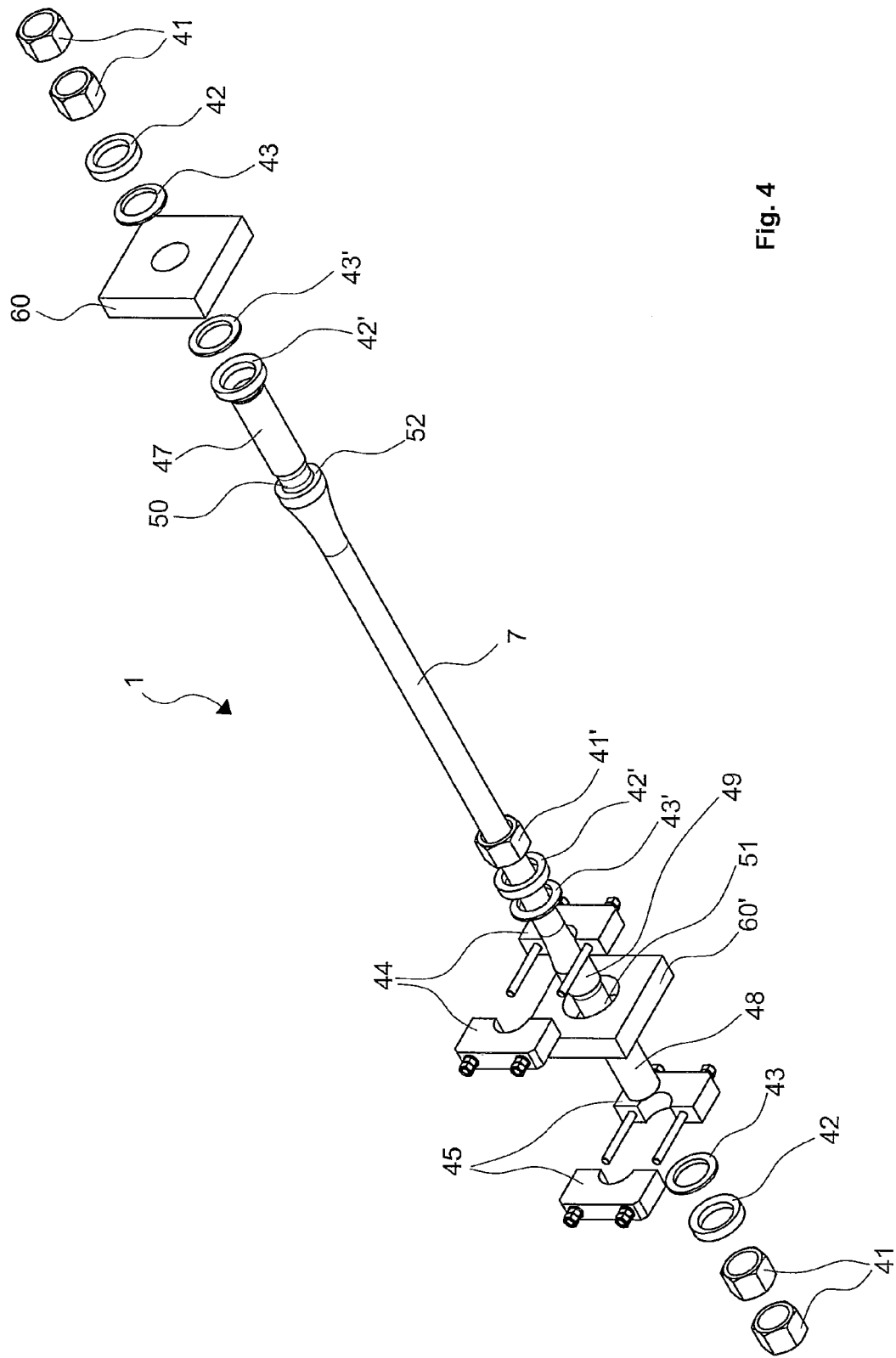
FIG. 4 is an exploded perspective view of a second embodiment of the tie rod of the invention.
Figure 5A:
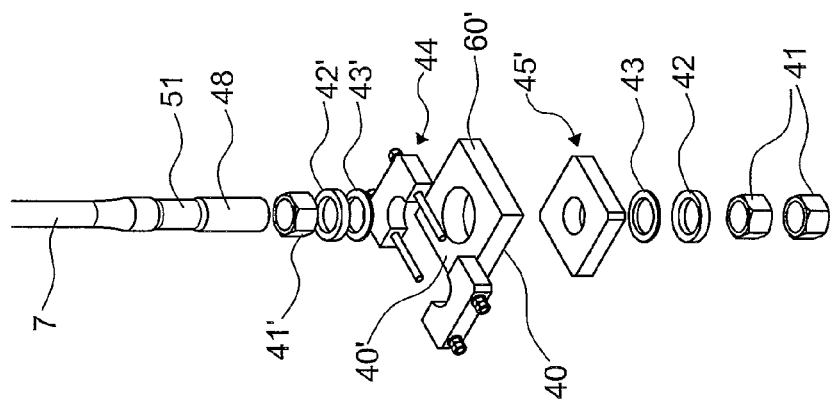
FIG. 5a is an exploded perspective view of a first part in FIG. 4 in a first variant thereof.
Figure 5B:
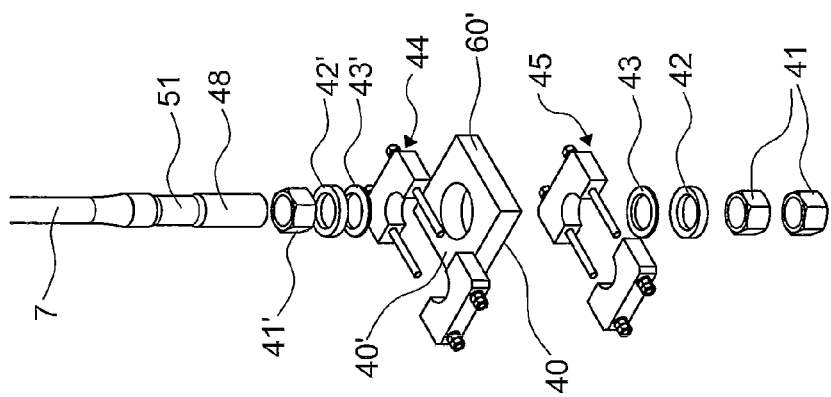
FIG. 5b is an exploded perspective view of a first part in FIG. 4 in a second variant thereof.

The diameter of the hole 80 of the end support 60' is larger than the diameter of the hole 70 of the end support 60. Flanges 44, 45 are provided with respective holes 90 of smaller diameter than the diameter of the hole 80. The flanges 44 and 45 may consist of semi-flanges (FIGS. 4, 5a and 7) held integrally with each other by means of fastening means, such as for example stud bolts with nut and lock nut. Alternatively, the external flange is instead made in one piece (FIG. 5b—external flange 45').

Figure 6:
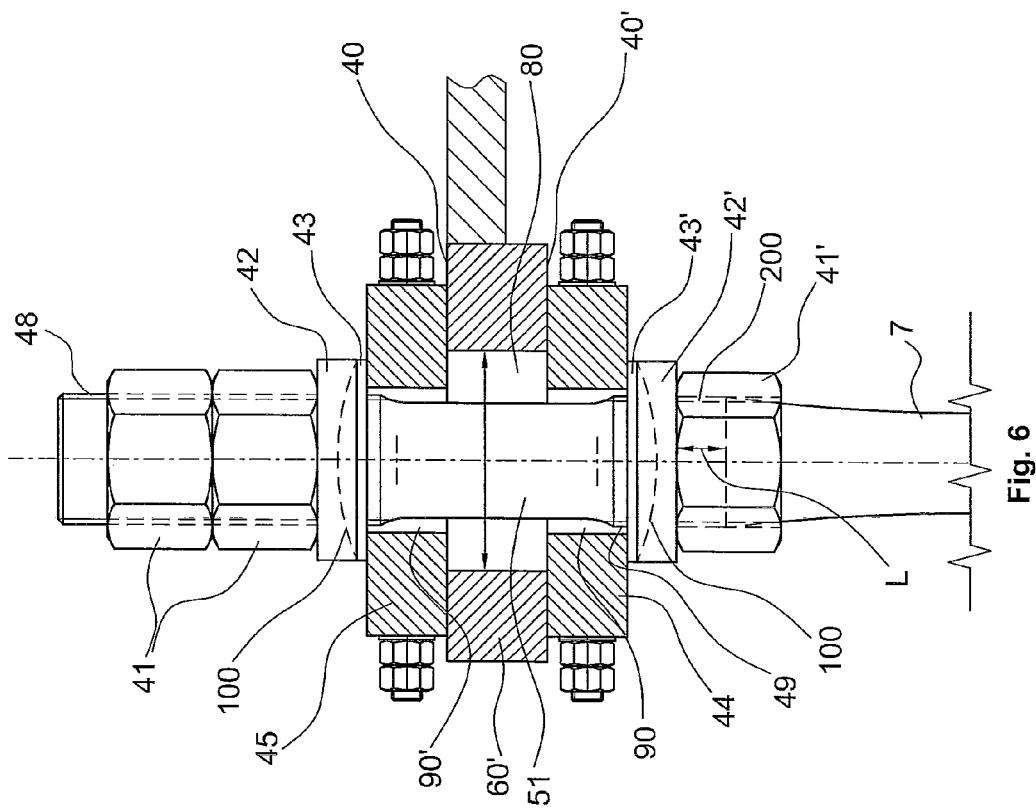
FIG. 6 is an enlarged section view of a first part of said second embodiment.

With reference to FIGS. 5, 6 and 8, the spacer 42' rests with a flat surface 55' thereof on the internal nut 41', while the spacer 43' rests with a flat surface 56' thereof on the flat surface of the internal flange 44. The spacer 43 rests instead with a flat surface thereof 56 on the flat surface of the external flange 45, while the flat surface 55 of the spacer 42 is pressed by the external tightening nuts 41.

By tightening the nuts 41 on the threaded end 48 of the bar 7 and tightening the internal nut 41' on the intermediate threaded portion 49, the joined surfaces 53', 54' of the spacers 43', 42' and the joined surfaces 53, 54 of the spacers 43, 42 achieve a complete contact with each other, respectively, while the flat surfaces 56, 56' press on the flanges 44, 45, which will adapt to the shape of the surfaces 40, 40' of the support 60'.

Advantageously, the internal tightening nut 41' is configured to be, in a fixed-end tie rod configuration, longer than length L of the useful part 200 of the thread of the intermediate threaded portion 49 protruding from the spacer 42' towards the inside of the bar 7. This allows to avoid notching stress concentrations due to uncovered threads of the part subjected to bending of the bar itself. Once tightened, the internal nut 41' will thus have covered threads at the area 91 (FIG. 9b) in which the bar tapers off towards the inside thereof.

In both embodiments of the tie rod of the invention, the elastic longitudinal bar 7 preferably has a circular section. However, other section shapes may by provided according to the designed longitudinal extension of the bar. The bar 7 is advantageously made of high-alloy steel, such as spring steel with high yield strength or other suitable steel with similar elasticity properties. Furthermore, the bar may be thermally treated (e.g. by means of hardening and tempering or solution heat-treatment according to the type of steel used) and may be provided with a surface coating, e.g. based on nickel, chrome or other suitable element. The high-quality material used allows to withstand very well not only mechanical stress but also oxidation which is very important in various contexts, such as for example that of oxygen converters. In all cases, the bar 7 is dimensioned according to the application required for the tie rod, so as to have a length and a thickness or diameter suited to operate in elastic field with infinite duration.

The tie rod object of the present invention may work as suspension element connecting a first mechanical member to a second mechanical member.

For example, a plurality of tie rods according to the invention clamped by means of non-spherical joints may constitute suspension elements which connect, in a tilting oxygen converter, the container 2 of the converter to the support ring 3 of said container and which also perform a centering function between container 2 and ring 3. In this case, the tie rods 1 are clamped at a first end to the container 2 and at a second end to the support ring 3. The bars 7 of the tie rods are appropriately dimensioned to operate as elastic support means for absorbing the thermal expansions which occur in this application context. In this case, the end supports 60, 60' will be part of respective fastening brackets welded or bolted to the container 2 and the support ring 3. The bars are locked at the ends to prevent parts from relatively moving and, with no parts subject to wear, maintenance activity is eliminated or at least notably reduced. The bars, acting as tie-rods or struts, are adjustable in order to compensate possible non-uniformity of the length of the bars, thus ensuring the correct positioning thereof.

The invention claimed is:

1. A tie rod comprising locking elements to lock ends of the tie rod to respective end supports, the tie rod being able to cross said end supports,
    wherein said locking elements comprise, at each end support, two pairs of spacers, each pair of spacers having surfaces joined to each other substantially in the shape of an annular portion of a spherical cap, and at least two tightening nuts,
    wherein, at each end support, there are provided in a configuration of the tie rod with fixed ends
        a first pair of spacers arranged at an external side of the end support,
        a second pair of spacers arranged at an internal side of the end support,
        wherein said first pair of spacers and said second pair of spacers are arranged symmetrically with respect to the end support,
        wherein the pair of joined surfaces of the first pair of spacers has a radius equal to a radius of the pair of joined surfaces of the second pair of spacers, said pairs of joined surfaces being arranged on different spherical surfaces,
    and wherein said at least two tightening nuts are tightened externally on said first pair of spacers.

2. A tie rod according to claim 1, wherein said locking elements comprise a pair of further spacers which, in the configuration of the tie rod with fixed ends, is provided at least at a first end support; a first further spacer being arranged between a pair of spacers and the respective side of said first end support and a second further spacer being arranged between the other pair of spacers and the respective side of said first end support.

3. A tie rod according to claim 2, wherein at said first end support there is provided a further tightening nut tightened on the pair of spacers arranged internally with respect to the first end support.

4. A tie rod according to claim 3, wherein said further tightening nut is configured to be, in the configuration of the tie rod with fixed ends, longer than the length of a useful part of thread of an intermediate threaded portion of the tie rod, said useful part of thread being protruding from the pair of spacers arranged internally with respect to the first end support.

5. A tie rod according to claim 4, comprising a longitudinal bar, provided with threaded ends on which said at least two tightening nuts are tightened, said bar comprising a central portion, delimited on one side by a shoulder and on the other side by said intermediate threaded portion, and two lateral portions; the first lateral portion being arranged between a first threaded end and the shoulder, the second lateral portion being arranged between the second threaded end and said intermediate threaded portion.

6. A tie rod according to claim 5, wherein the first lateral portion has a smaller diameter with respect to the diameter of the adjacent threaded end and the second lateral portion has a smaller diameter with respect to the diameter of the adjacent threaded end and the adjacent intermediate threaded portion.

7. A tie rod according to claim 1, comprising a longitudinal bar, provided with threaded ends on which said at least two tightening nuts are tightened, said bar comprising a central portion, delimited by two shoulders, and two lateral portions, each lateral portion being arranged between a threaded end and the corresponding shoulder.

8. A tie rod according to claim 7, wherein each lateral portion has a smaller diameter with respect to the diameter of the adjacent threaded end.

9. A suspension system connecting a first element to a second element, comprising a plurality of tie rods according to claim 1.

10. A tilting converter comprising a suspension system according to claim 9, wherein said first element is a container of the converter and said second element is a support ring of said container, wherein said tie rods are restrained at a first end to the container and at a second end to the support ring, and wherein the respective two end supports of each tie rod are integrally fixed with respect to the container and the support ring, respectively.

* * * * *